(12) United States Patent
Teller et al.

(10) Patent No.: US 9,211,959 B2
(45) Date of Patent: Dec. 15, 2015

(54) UAV LAUNCHING FROM MOVING PLATFORM

(71) Applicants: Igor Teller, Rehovot (IL); Pavel Soifer, Rehovot (IL)

(72) Inventors: Igor Teller, Rehovot (IL); Pavel Soifer, Rehovot (IL)

(73) Assignees: Pavel Soifer, Rehovot (IL); Igor Teller, Rehovot (IL)

( * ) Notice: Subject to any disclaimer, the term of this patent is extended or adjusted under 35 U.S.C. 154(b) by 0 days.

(21) Appl. No.: 14/197,389

(22) Filed: Mar. 5, 2014

(65) Prior Publication Data

US 2014/0252162 A1    Sep. 11, 2014

(30) Foreign Application Priority Data

Mar. 11, 2013    (IL) .......................................... 225152

(51) Int. Cl.
    *B64F 1/10*    (2006.01)
(52) U.S. Cl.
    CPC ............... *B64F 1/10* (2013.01); *B64C 2201/08* (2013.01); *B64C 2201/205* (2013.01); *B64C 2201/208* (2013.01)
(58) Field of Classification Search
    CPC ......... B64F 1/04; B64F 1/10; B64C 2201/08; B64C 2201/205; B64C 2201/206; B64C 2201/208
    See application file for complete search history.

(56) References Cited

U.S. PATENT DOCUMENTS

| | | | | |
|---|---|---|---|---|
| 2,734,702 | A * | 2/1956 | Northrop et al. | 244/63 |
| 2,774,557 | A * | 12/1956 | Jakimiuk et al. | 244/63 |
| 6,712,312 | B1 * | 3/2004 | Kucik | 244/1 R |
| 7,039,367 | B1 * | 5/2006 | Kucik | 455/96 |
| 7,665,691 | B2 * | 2/2010 | Hanzlick et al. | 244/63 |
| 8,014,909 | B2 * | 9/2011 | Builta et al. | 701/7 |
| 8,862,288 | B2 * | 10/2014 | Vavrina et al. | 701/3 |
| 8,899,903 | B1 * | 12/2014 | Saad et al. | 414/392 |
| 2007/0228214 | A1 * | 10/2007 | Horak | 244/63 |
| 2008/0203220 | A1 * | 8/2008 | Hanzlick et al. | 244/63 |
| 2008/0283661 | A1 * | 11/2008 | Henley | 244/114 R |
| 2013/0081245 | A1 * | 4/2013 | Vavrina et al. | 29/402.08 |

* cited by examiner

*Primary Examiner* — Joseph W Sanderson
(74) *Attorney, Agent, or Firm* — Roach Brown McCarthy & Gruber, P.C.; Kevin D. McCarthy

(57) ABSTRACT

A system for launching an unmanned aerial vehicle (UAV) from a moving platform, the system including: a platform configured to carry the UAV; one or more sensors configured to measure forces acting between the platform and the UAV in one or more directions; a mooring mechanism configured to moor the UAV to the platform; and a controller configured to: transmit at least one trimming command to the UAV based on measurements of the one or more sensors, and cause the mooring mechanism to release the UAV from the platform following the transmitting of the at least one trimming command, when the measurements of the one or more sensors indicate that a lift force is sufficiently close to a weight of the UAV.

24 Claims, 2 Drawing Sheets

UAV LAUNCHING FROM MOVING PLATFORM

FIELD OF THE INVENTION

The invention relates to the field of UAV launching.

BACKGROUND

UAVs (Unmanned Air Vehicles) are used worldwide for a variety of purposes and missions, such as aerial photography, land surveys and more. In order to perform these missions, UAVs can carry a variety of payloads such as cameras and other sensors.

Like manned air vehicles, UAVs are available in fixed-wing and rotary wing configurations. Usually, large-scale UAVs require a takeoff runway to get airborne, like most manned air vehicles do, while some small-scale UAVs can be field-launched with no need of runways, for example by a dedicated launcher.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a system for launching an unmanned aerial vehicle (UAV) from a moving platform, the system comprising: a platform configured to carry the UAV; one or more sensors configured to measure forces acting between said platform and said UAV in one or more directions; a mooring mechanism configured to moor said UAV to said platform; and a controller configured to: (a) transmit at least one trimming command to said UAV based on measurements of said one or more sensors, and (b) cause said mooring mechanism to release said UAV from said platform following the transmitting of the at least one trimming command, when the measurements of said one or more sensors indicate that a lift force is sufficiently close to a weight of the UAV.

There is further provided, in accordance with an embodiment, a method for launching an unmanned aerial vehicle (UAV) from a moving platform, the method comprising: continuously measuring forces acting between a moving platform and a UAV carried by the moving platform in one or more directions; based on said measuring of forces, computing at least one trimming command and transmitting the at least one trimming command to said UAV; and launching the UAV following the transmitting of the at least one trimming command, when said measuring indicates that a lift force is sufficiently close to a weight of the UAVs.

In some embodiments, said UAV comprises an autogyro-type UAV.

In some embodiments, said UAV comprises a fixed-wing UAV.

In some embodiments, the at least one trimming command is configured to cause movement of aerodynamic surfaces of said UAV, so as to affect aerodynamic forces acting at least on a pitch axis of the UAV and a roll axis of the UAV.

In some embodiments, said one or more sensors comprise one or more load sensors configured to provide a reading of an amount of force applied on said one or more load sensors.

In some embodiments, said one or more sensors are comprised in said platform.

In some embodiments, said one or more sensor are comprised in said UAV.

In some embodiments, said controller is configured to yield a roll trimming command to counter an acting roll moment, by performing subtraction between readings of right and left landing gear sensors of said one or more sensors.

In some embodiments, said controller is configured to yield a pitch trimming command to counter an acting pitch moment, by performing subtraction between readings of a front landing gear sensor of said one or more sensors and combined readings of right and left landing gear sensors of said one or more sensors.

In some embodiments, said controller is configured to cause said mooring mechanism to release said UAV from said platform by comparing combined readings of front, right and left landing gear sensors of said one or more sensors to zero or to a value sufficiently close to zero.

In some embodiments, said controller is further configured to accept a manual definition of one or more coefficients and to multiply the sensor readings by the one or more coefficients.

In some embodiments, said measuring is performed using one or more load sensors configured to provide a reading of an amount force applied on said one or more load sensors.

In some embodiments, the transmitting of the at least one trimming command comprises transmitting a roll trimming command to counter an acting roll moment, by performing subtraction between readings of right and left landing gear sensors of said one or more sensors.

In some embodiments, the transmitting of the at least one trimming command comprises transmitting a pitch trimming command to counter an acting pitch moment, by performing subtraction between readings of a front landing gear sensor of said one or more sensors and combined readings of right and left landing gear sensors of said one or more sensors.

In some embodiments, the method further comprises releasing said UAV from said platform when combined readings of front, right and left landing gear sensors of said one or more sensors are zero or a value sufficiently close to zero.

In some embodiments, the method further comprises receiving a manual definition of one or more coefficients and multiplying the sensor readings by the one or more coefficients.

In some embodiments, the method further comprises applying signal filtering to the sensors readings, to reduce short term effects.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

A system and a method for launching a UAV from a moving platform is disclosed herein. The present UAV may be used for a variety of purposes and missions, such as aerial photography, land surveys, etc., and may carry a variety of payloads such as one or more cameras, sensors, etc. A UAV, such as the present one, often requires the pre-existence of some conditions for successful takeoff (also "launch"), for example takeoff generally into the wind, head and side wind velocities should be within allowed limitations, sufficient takeoff velocity, a desired angle of attack, correct roll, pitch and/or yaw trimming, etc. Compliance with all of these conditions, in existing UAVs, usually takes a great deal of attention and preparations on the part of the operator, consumes a lot of time before takeoff, and puts constrains on the takeoff place, direction, timing, etc. A similar problem also exists with manned aircraft (fixed-wing, helicopters, etc.) taking off from a moving platform. For example, taking off with a helicopter from a moving ship takes a great deal of attentiveness from the pilot.

Therefore, a method for automatic UAV (or manned aircraft) trimming and launching is highly advantageous for UAV operators (or pilots). Moreover, launching the UAV from a moving platform (such as a land or a sea vehicle) is even more advantageous because it makes long takeoff runways unnecessary and allows for convenient field launching, without the need to offload the UAV from the vehicle first. The present system and method may overcome the inherent difficulties in launching a UAV from a moving platform by providing automatic trimming of the UAV prior to launch, and timing the launch to only after the UAV is properly trimmed. This way, the UAV may safely takeoff from the platform, with a greatly lowered risk of crashing immediately following the launch—a risk which is heightened with moving platform launches.

Advantageously, in accordance with the present system and method, the extent of at least some of the aerodynamic forces acting on the UAV are deduced, indirectly, by measuring the forces acting between the UAV and the platform.

Figure 1:
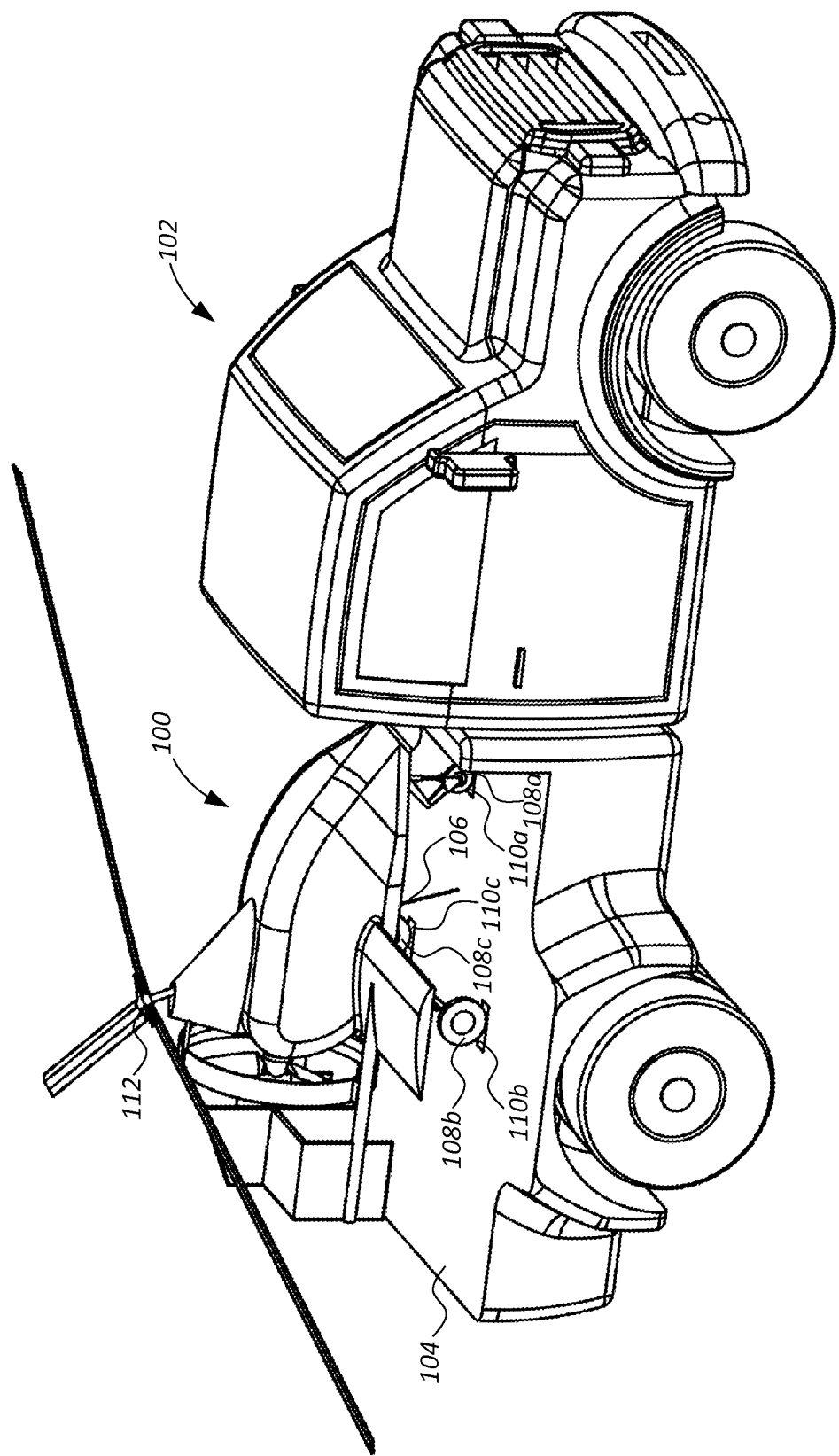
FIG. 1 shows a perspective view of an autogyro-type UAV on a launching platform.

The present system and method for pre-launch trimming may be better understood with reference to the accompanying drawings. Reference is now made to FIG. 1, which shows a perspective view of an autogyro-type UAV (100) carried by a mobile launching platform, represented here, merely as an example, by a truck (102). For illustrative reasons, FIG. 1 depicts an autogyro type UAV, but the present discussions are intended to be applicable to other kinds of UAVs, for example a fixed-wing UAV, a helicopter UAV, etc. UAV (100) may be also launched from a different moving platform, such as another type of a ground vehicle, a sea vessel, etc.

In some embodiments, the present system and method may be also applied to manned aircraft (fixed-wing, helicopters, etc.) taking off from a moving platform.

UAV (100) may be moored to a launching surface (104) of truck (102) by a mooring mechanism (106), which may include an elastic or a rigid mooring element, for example a rope or a rod, and a release actuator controllable by a hardware processor. The mooring element may be permanently anchored on its one end, and connected to the release actuator on its other end. The release actuator may be mounted on launching surface (104) and/or on UAV (100). The mooring mechanism may also hold and release one or more of the landing gears.

The present system and method are based on automatically computing and transmitting trimming commands using measurement of forces and/or moments which interact between the UAV and the platform, sensed by one or more sensors.

By way of example, UAV (100) rests on three landing gears: an FLG (Front Landing Gear, 108a), an RLG (Right Landing Gear, 108b), and an LLG (Left Landing Gear, 108c). Each landing gear may have a corresponding sensor: an FLG sensor (110a), an RLG sensor (110b), and an LLG sensor (110c). UAV (100) may be equipped with a different landing gear, for example a landing gear having a different number of wheels, a pair of skids, etc.

The sensors, such as FLG sensor (110a), RLG sensor (110b), and LLG sensor (110c), may be configured to output information about force and/or stress applied on or by a specific location in the UAV. Each sensor may measure force in one or more directions. Suitable sensors may include strain gauges, load cells, accelerometers, etc. The sensors may be embedded in the UAV itself, for example strain gauges mounted on the landing gears that measure the weight on each landing gear, etc. They may also be embedded in the launching surface, for example strain gauges under the landing gears that measure the weight applied by each landing gear, etc.

UAV (100) uses aerodynamic surfaces to steer and maneuver. In the case of autogyro type UAVs, the main aerodynamic surface is its main rotor (112). The UAV's flight control system tilts main rotor (112) to the right or to the left in order to roll right or left, and to the front or to the back in order to pitch down or up.

The pre-launch trimming system may use the sensor readings as inputs to a hardware processor which may compute the required pitch, roll and/or yaw commands and may output these commands to the UAV flight control system which, in turn, may move the UAV's aerodynamic surfaces accordingly, keeping it trimmed.

In some embodiments, the system may also compute and output an engine power increase/decrease command, to keep a desired thrust-drag ratio.

Moreover, the processor may compute the correct time to launch the UAV, and outputs a release command to mooring mechanism (106). The processor may be embedded in the UAV, for example the trimming computations may be done by the UAV's central computer, flight control computer, etc. Alternatively, it may be embedded in the launching platform, or in a UAV ground control station.

Figure 2:
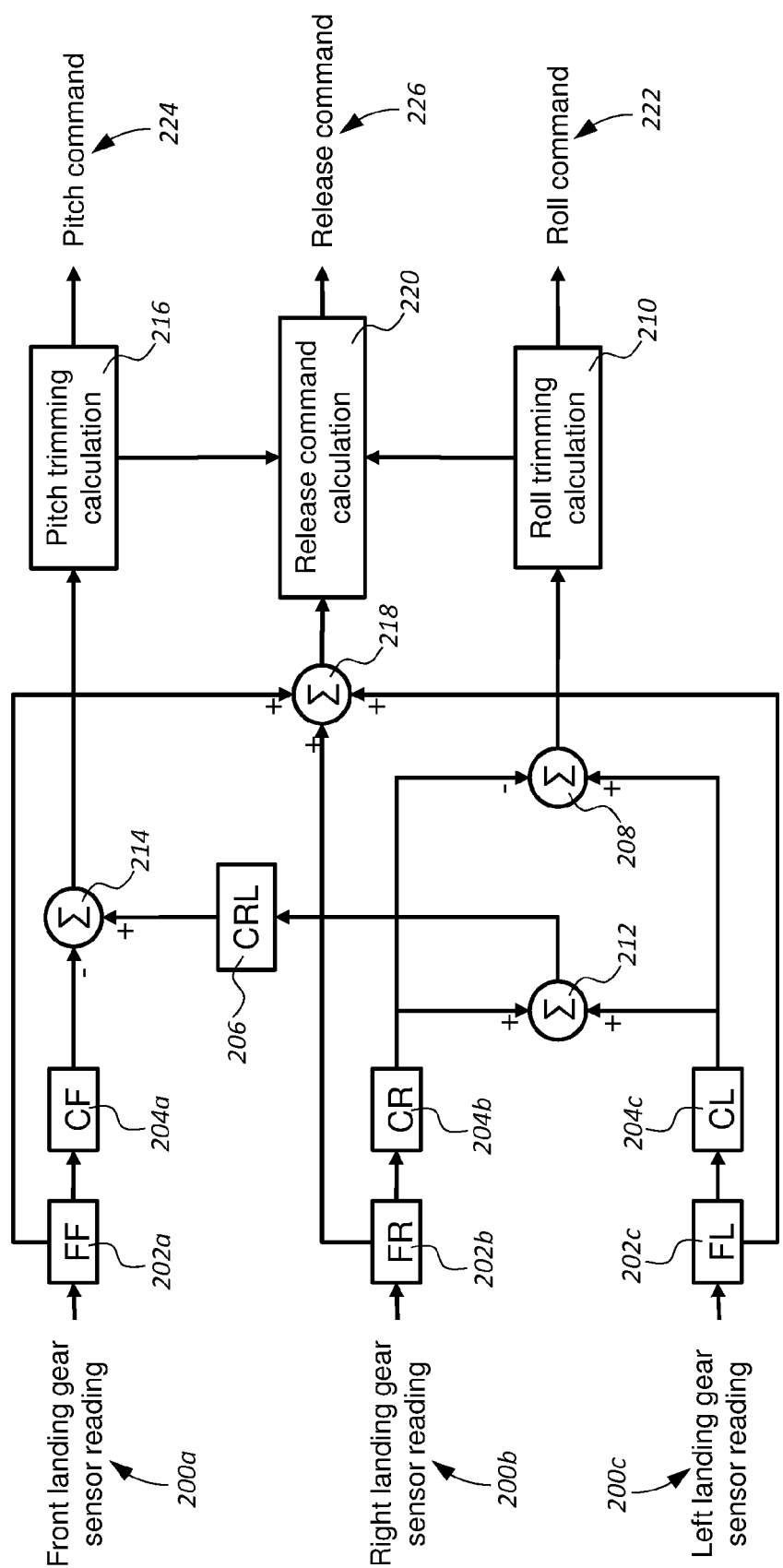
FIG. 2 shows a flowchart of a pre-launch trimming computation method.

Reference is now made to FIG. 2, which shows a flowchart of a pre-launch trimming computation method, in accordance with some embodiments. In this method, by way of example, an FLG sensor reading (200a), an RLG sensor reading (200b), and an LLG sensor reading (200c) may be used as inputs. In this exemplary case, these sensors may measure the weight of the aircraft applied on them.

Filters may be used to reduce effects of short time vibrations, shocks, noise, etc: an FF (Filter Front, 202a) is the filter of the FLG and may filter FLG sensor reading (200a), an FR (Filter Right, 202b) is the filter of the RLG and may filter RLG sensor reading (200b), and an FL (Filter Left, 202c) is the filter of the LLG and may filter LLG sensor reading (200c). The filters may be implemented by various functions such as HPF (High Pass Filter), BPF (Band Pass Filter), LPF (Low Pass Filter), Kalman filter, signal averaging, etc.

Tunable coefficients may be used in order to allow degrees of freedom and flexibility to the system behavior: a CF (Coefficient Front, 204a) is the coefficient of the FLG and may multiply FLG sensor reading (200a), a CR (Coefficient Right, 204b) is the coefficient of the RLG and may multiply RLG sensor reading (200b), a CL (Coefficient Left, 204c) is the coefficient of the LLG and may multiply LLG sensor reading (200c), and a CRL (Coefficient Right Left, 206) is the coefficient of the combined RLG and LLG and may multiply RLG and FLG sensor readings (200b and 200c, respectively). The tunable coefficients may be useful to the system designer while developing and testing the system, and to the end user, for supporting the launch of different UAV configurations, different COG (Center Of Gravity) locations, etc.

The roll command (222) may be calculated as follows: an aggregator (208) may subtract RLG sensor reading (200b) from LLG sensor reading (200c). The roll trimming calculation module (210) may calculate the direction and size of the roll moment according to the discovered difference, and may output a counter roll command with a respective size to the calculated roll moment. For example, if the difference is positive, it means that there is a left roll moment, and roll trimming calculation module (210) will output a right roll command. Roll trimming calculation module (210) may also output the roll trimming status (trimmed or not trimmed) to the release command calculation module (220).

The pitch command (224) may be calculated as follows: an aggregator (212) may sum RLG sensor reading (200b) and LLG sensor reading (200c). Afterwards, another aggregator (214) may subtract FLG sensor reading (200a) from the combined RLG and LLG sensor readings. The pitch trimming calculation module (216) may calculate the direction and size of the pitch moment according to the discovered difference, and may output a counter pitch command with a respective size to the calculated pitch moment. For example, if the difference is positive, it means that there is a pitch up moment, and pitch trimming calculation module (216) will output a pitch down command. Pitch trimming calculation module (216) may also output the pitch trimming status (trimmed or not trimmed) to release command calculation module (220).

The release command (226) may be calculated as follows: an aggregator (218) may sum FLG sensor reading (200a), RLG sensor reading (200b) and LLG sensor reading (200c). Release command calculation module (220) may compare this sum to zero. It may also receive the roll and pitch trimming statuses (trimmed or not trimmed) from roll trimming calculation module (210) and from pitch trimming calculation module (216), respectively. If the sum of all sensors readings is a value close enough or equal to zero, and the roll and pitch are trimmed, release command calculation module (220) may output a release command.

The described trimming computation method may be also used in configurations which include a different sensor number and/or locations, with the required adaptations.

In some embodiments, the present method and system may include a non-computerized mechanism for releasing the UAV from the platform. This mechanism may release the UAV, for example, responsive to sufficient lift gained by the UAV, which separates it from the platform. The mechanism may include, for instance, a breakable safety catch with or without an option for adjustment.

In some embodiments, no trimming is performed, and the method and system include only the releasing of the UAV from the platform. In one such embodiment, the aforementioned non-computerized mechanism is used. In another such embodiment, one or more sensors are used to determine when to release the UAV, which release is performed electro-mechanically.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

What is claimed is:

1. A system for launching an unmanned aerial vehicle (UAV), the system comprising:
    a platform configured to carry the UAV;
    one or more sensors configured to measure forces acting between said platform and said UAV in one or more directions;
    a mooring mechanism configured to moor said UAV to said platform; and
    a controller configured to:
        (a) transmit at least one trimming command to said UAV based on measurements of said one or more sensors, and
        (b) cause said mooring mechanism to release said UAV from said platform (i) following the transmitting of the at least one trimming command, and (ii) based on the measurements of said one or more sensors that are indicative of a lift force acting on the UAV.

2. The system according to claim 1, wherein said UAV comprises an autogyro-type UAV.

3. The system according to claim 1, wherein said UAV comprises a fixed-wing UAV.

4. The system according to claim 1, wherein the at least one trimming command is configured to cause movement of aerodynamic surfaces of said UAV, so as to affect aerodynamic forces acting at least on a pitch axis of the UAV and a roll axis of the UAV.

5. The system according to claim 1, wherein said one or more sensors comprise one or more load sensors configured to provide a reading of an amount of force applied on said one or more load sensors.

6. The system according to claim 1, wherein said one or more sensors are comprised in said platform.

7. The system according to claim 1, wherein said one or more sensor are comprised in said UAV.

8. The system according to claim 1, wherein said controller is configured to yield a roll trimming command to counter an acting roll moment, by performing subtraction between readings of right and left landing gear sensors of said one or more sensors.

9. The system according to claim 8, wherein said controller is further configured to accept a manual definition of one or more coefficients and to multiply the sensors readings by the one or more coefficients.

10. The system according to claim 8, wherein said controller is further configured to apply signal filtering to the sensor readings, to reduce short term effects.

11. The system according to claim 1, wherein said controller is configured to yield a pitch trimming command to counter an acting pitch moment, by performing subtraction between readings of a front landing gear sensor of said one or more sensors and combined readings of right and left landing gear sensors of said one or more sensors.

12. The system according to claim 1, wherein said controller is configured to cause said mooring mechanism to release said UAV from said platform by comparing combined readings of front, right and left landing gear sensors of said one or more sensors to zero.

13. A method for launching an unmanned aerial vehicle (UAV), the method comprising:
    continuously measuring forces acting between a moving platform and a UAV carried by the moving platform in one or more directions;

based on said measuring of forces, computing at least one trimming command and transmitting the at least one trimming command to said UAV; and launching the UAV (i) following the transmitting of the at least one trimming command, and (ii) based on said measuring that is indicative of a lift force acting on the UAV.

14. The method according to claim 13, wherein said UAV comprises an autogyro-type UAV.

15. The method according to claim 13, wherein said UAV comprises a fixed-wing UAV.

16. The method according to claim 13, wherein the at least one trimming command is configured to cause movement of aerodynamic surfaces of said UAV, so as to affect aerodynamic forces acting at least on a pitch axis of the UAV and a roll axis of the UAV.

17. The method according to claim 13, wherein said measuring is performed using one or more load sensors configured to provide a reading of an amount of force applied on said one or more load sensors.

18. The method according to claim 17, wherein said one or more sensors are comprised in said platform.

19. The method according to claim 17, wherein said one or more sensor are comprised in said UAV.

20. The method according to claim 17, further comprising releasing said UAV from said platform when combined readings of front, right and left landing gear sensors of said one or more sensors are zero.

21. The method according to claim 13, wherein the transmitting of the at least one trimming command comprises transmitting a roll trimming command to counter an acting roll moment, by performing subtraction between readings of right and left landing gear sensors of said one or more sensors.

22. The method according to claim 21, further comprising receiving a manual definition of one or more coefficients and multiplying the sensor readings by the one or more coefficients.

23. The method according to claim 21, further comprising applying signal filtering to the sensor readings, to reduce short term effects.

24. The method according to claim 13, wherein the transmitting of the at least one trimming command comprises transmitting a pitch trimming command to counter an acting pitch moment, by performing subtraction between readings of a front landing gear sensor of said one or more sensors and combined readings of right and left landing gear sensors of said one or more sensors.

* * * * *